US005475712A

United States Patent [19]

Sasaki

[11] Patent Number: 5,475,712

[45] Date of Patent: Dec. 12, 1995

[54] VOICE CODING COMMUNICATION SYSTEM AND APPARATUS THEREFOR

[75] Inventor: Seishi Sasaki, Sendai, Japan

[73] Assignee: Kokusai Electric Co. Ltd., Tokyo, Japan

[21] Appl. No.: 349,485

[22] Filed: Dec. 2, 1994

[51] Int. Cl.[6] .......... H04B 1/10

[52] U.S. Cl. .......... 375/241; 381/36; 395/2.28; 395/2.32; 455/281

[58] Field of Search .......... 375/351, 241; 381/36; 455/281, 282; 395/2.2, 2.28, 2.32; 379/34

[56] References Cited

U.S. PATENT DOCUMENTS

| | | | |
|---|---|---|---|
| 5,313,554 | 5/1994 | Ketchum | 395/2.28 |
| 5,339,384 | 8/1994 | Chen | 395/2.2 |
| 5,410,632 | 4/1995 | Hong et al. | 395/2.42 |
| 5,414,796 | 5/1995 | Jacobs et al. | 395/2.3 |

OTHER PUBLICATIONS

Paksoy et al, "Voriable Rate Speech Coding with Phonetic Segmentation," ICASSP'93 Acoustics Speech & Signal Processing: 1993 pp. II155–II160.

Geustro et al "An Overview of variable rate speech coding for cellular networks", Wireless Communications, Selected Topics, Int'l Conf. 1992 pp. 172–177.

Guas et al, "A Power–conserved Realtime Speech Coder at low bit rate," Supercomm/ICC'92: Discovering a New World of Communications, 1992, pp. 62–67.

Peng et al. "Variable–rate Low–Delay AnaLysis–by–synthesis speech coding" at 8–16kus class ICASSP'91: Acoustics Speech & Signal Processing Conf. pp. 29–34.

Yladimir Cupermon, "Dow Delay Speech Coding" Signals Systems & Computers, 1991 25th Asilomar Conf. pp. 935–941.

Soheili et al, "As 8KB/S LD–Celp with improved Excitation and Perceptoal Modelling." ICASSP 93: Acoustics, Speech & Signal Processing Conf. pp. 616–619.

Cuperman et al, "Low–Delay Vector Excitation Coding of Speech at 16kb/s". IEEE Trans. on Communications. vol. 40 No. 1 Jan. 1992 pp. 129–139.

Wenshon et al, "Integration of LD–CELP & echo Canceller" Tencon '93–1993 IEEE Region 10 Conf. on Computer/ Communications. pp. 287–290.

Sasaki et al, "Voice activity detection & transmission error Control for digital cordless telephone system" IEICe Trans. on Comm. vol. E77–B No. 7 pp. 948–955.

*Primary Examiner*—Stephen Chin
*Assistant Examiner*—Bryan Webster
*Attorney, Agent, or Firm*—Emmanuel J. Lobato

[57] ABSTRACT

A low-delay code excited linear prediction (LD-CELP) voice coding systemapplied to a scheme, in which the transmitting side interrupts transmission during the voice-nonactive period and the receiving side generates and outputs a comfort noise during the voice-nonactive period. At the transmitting side, when voice non activity is detected by the voice activity detector, the CN flag indicating the interruption of transmission is sent from the CN flag generator and shortly thereafter a background noise from the LD-CELP encoder is sent, followed by the interruption of transmission. At the receiving side, when the background noise following the CN flag is decoded by the LD-CELP decoder, the internal gain and synthesis filter coefficients are held, which is subsequently used to decode the input from the pseudo-noise generator.

3 Claims, 4 Drawing Sheets

VOICE CODING COMMUNICATION SYSTEM AND APPARATUS THEREFOR

BACKGROUND OF THE INVENTION

The present invention relates to a voice coding communication system and an apparatus therefor and, more particularly, to a voice coding communication system which employs a 16 kbit/s voice coding system utilizing a low-delay code excited linear predition (hereinafter referred to as LD-CELP) scheme and an apparatus for implementing the voice coding communication system.

It is said that the voice activity factor in voice communications is around 35%.

With the recent diversification and internationalization of social and economic activities, expectations for mobile communication are rapidly rising. Among others, portable type car telephones and cordless telephones are now in highly increasing demand. Such portable terminals of mobile communication systems use batteries for the convenience of portability and the batteries need to stand long-time use; hence, the reduction of circuit power dissipation is required.

One method that has been proposed to reduce the circuit power consumption is a method which, noting the voice activity factor, actuates the transmitting circuit for the voice-active duration only and keep the circuit inoperative for the silent or voice-nonactive duration. This could be implemented by providing at the transmitting side a voice activity detector for detecting the voice activity and a discontinuous transmitter for stopping the operation of the transmitting circuit during the silent period.

In this instance, the receiving side presents a problem. That is, at the receiving side, the reproduced voice is discontinuous, and hence is very annoying. As is well-known in the art, this is attributable to the fact that during the transmission of a voice a background noise is superimposed on the voice but during the voice-nonactive or silent period no background noise is sent either; namely, the fact that the background noise is step-modulated according to the presence or absence of the voice signal.

A known solution to this problem is a method which generates, at the receiving side, a comfort noise similar to the background signal in the transmitting side while no voice signal is transmitted therefrom. This technique was studied first for a digital communication using a high efficiency voice coding system (13 kbit/s or lower) based on an analysis-synthesis scheme which analyzes and sends a voice signal and synthesizes it at the receiving side, and the technique has become widely known after establishment of its standardization algorithm for the digital car telephone.

On the other hand, the inventors of this application have already proposed a method for adding such capability to a 32 kbit/s adaptive differential PCM (ADPCM: Adaptive Differential Pulse Code Modulation) which is one of waveform coding techniques adopted as a standard voice coding system of a digital cordless telephone system (a full-rate system) (see Japanese Pat. Appln. No. 69747/92).

A half-rate system is now under development which will in the near future enable the digital cordless telephone system to increase the number of channels twice that in the full-rate system without changing the transmission rate of the radio section so as to implement efficient frequency utilization as in the case of the digital car telephone system. The standard voice coding system that is adopted in this half-rate system is a 16 kbit/s voice coding system employing the low-delay code excited linear prediction (LD-CELP) scheme (see TTC JT-G728 Standard).

As matters now stand, no study is being given on the technique of using, in connection with the LD-CELP scheme which is a half-rate standard voice coding system of the digital cordless telephone, the method of detecting a voice during the voice coding at the transmitting side and the capability of generating a comfort noise at the receiving and decoding side.

SUMMARY OF THE INVENTION

The present invention is directed to a method of adding the LD-CELP scheme with the capability of generating at the receiving side a comfort noise similar to the background noise signal at the sending side while no voice signal is being sent to the receiving side.

An object of the present invention is to provide voice coding communication system and apparatus which alleviate the unplesantness of the reproduced voice signal by inserting thereinto an effective comfort noise in the LD-CELP voice coding system involving discontinuous transmission processing.

The voice coding communication system according to the present invention, which, with a view to reducing the transmitting power of a voice coding apparatus, interrupts transmission therefrom during the silent or voice-nonactive period and uses as the reproduced output in that period a comfort noise generated at the receiving side, is characterized in:

that the transmitting side sends a voice signal after coding it by the 16 kbit/s voice coding system utilizing the low-delay code excited linear prediction (LD-CELP) scheme and, during the silent period, sends a CN flag indicating the silent period and a coded background noise for a predetermined period of time only at predetermined time intervals; and that the receiving side decodes the received signal by an LD-CELP decoder and outputs the reproduced signal and, when detecting the CN flag from the received signal, holds the coefficients of a synthesis filter and the gain of a gain scaling unit which are internal parameters of the LD-CELP decoder in correspondence to the coded background noise following the CN flag, then switches the input to the LD-CELP decoder to the pseudo-noise generated at the receiving side and decodes the received signal through utilization of the coefficients of the synthesis filter and the gain of the gain scaling unit to obtain the reproduced signal as comfort noise.

The voice coding apparatus for implementing such a communication system according to the present invention, which is provided with a discontinuous transmitter for interrupting transmission during the silent period to reduce the transmitting power for transmitting an input voice signal after encoding it, is characterized by:

an LD-CELP encoder for encoding the input voice signal into an LD-CELP code;

a voice activity detector for detecting the presence or absence of the voice of the input signal;

a CN (Comfort Noise) flag generator for generating a CN flag indicating the silent period;

a switch for switching mutually the output of the LD-CELP encoder and the output of the CN flag generator;

a discontinuous transmitter which transmits the output from the switch to a transmission line and, after a certain elapsed timed from the transmitting of the CN flag, interrupts transmission until the transmitting of the next CN flag or until a voice-active period begins; and a control circuit which, upon detecting the start of the silent or voice-nonactive period by the signal from the voice activity detector, controls the switch to send the CN flag and the encoded background noise from the LD-CELP encoder for the predetermined period at the predetermined time intervals during the silent period and outputs a reset signal for resetting the LD-CELP encoder at a predetermined point in time.

The decoding apparatus for the above-mentioned communication system according to the present invention, which is supplied with, as a received signal, a signal interrupted to be transmitted in a voice-nonactive period after a CN flag indicating the silent period of an LD-CELP encoded voice signal and an LD-CELP encoded background noise are sent for a predetermined period of time at predetermined time intervals, is characterized by:

a pseudo-noise generator for generating the pseudo-noise;

an LD-CELP decoder which decodes the received signal and holds the coefficient of a synthesis filter and the gain of a gain scaling unit at the time of having decoded the LD-CELP encoded background noise, then decodes a generated pseudo-noise inputted next by the use of the held coefficients of the synthesis filter and the held gain of the gain scaling unit thus held;

a switch for selectively inputting the received signal and the pseudo-noise into the LD-CELP decoder; and a control circuit which controls the switch for switching to the pseudo-noise generator side upon completion of the decoding of the LD-CELP encoded background noise after the detection of the CN flag from the received signal and for switching to the received signal side upon detecting the CN flag next, controls the LD-CELP decoder to hold or update the coefficients of the synthesis filter and the gain of the gain scaling unit in accordance with the operation of the switch and outputs a reset signal for resetting the LD-CELP decoder at a predetermined point in time.

BRIEF DESCRIPTION OF THE DRAWINGS

The present invention will be described in detail below with reference to the accompanying drawings, in which.

PREFERRED EMBODIMENTS OF THE INVENTION

Figure 1:
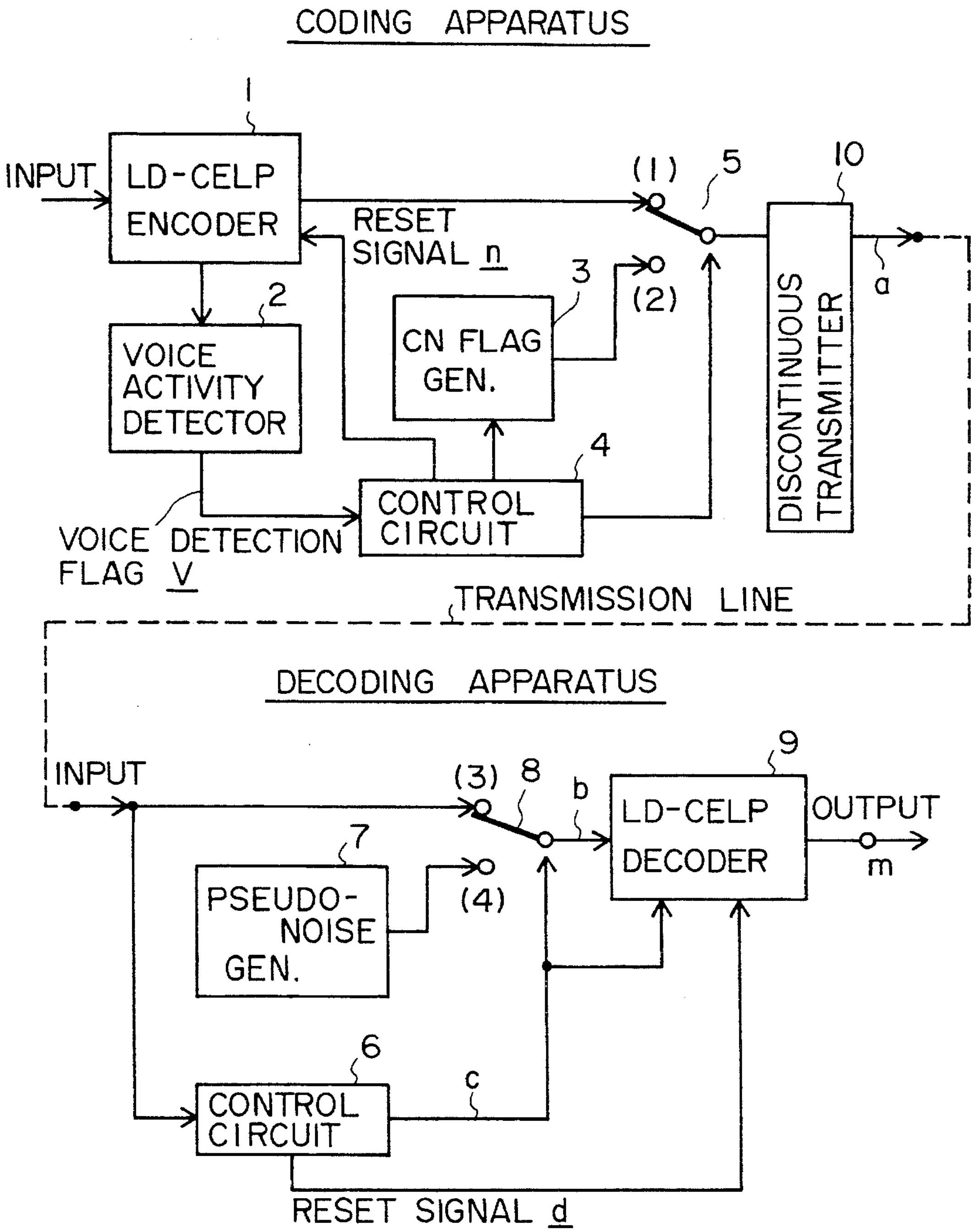
FIG. 1 is a block diagram illustrating an embodiment of the present invention.

FIG. 1 is a block diagram illustrating an embodiment of the present invention.

In the coding apparatus shown in FIG. 1, reference numeral 1 denotes an LD-CELP encoder, which utilizes the conventional LD-CELP system defined by the TTC JT-G728 Standards. The LD-CELP encoder is reset to an initial state by a reset signal n from a control circuit 4 described later.

Reference numeral 2 denotes a voice activity detector which detects the presence or absence of a voice and provides a voice detection flag v (a signal indicating the presence or absence of a voice) to the control circuit 4.

Reference numeral 3 denotes a CN (Comfort Noise) flag generator, which generates a CN flag indicating the voice-nonactive period and the succeeding transmission of CN data (background noise data for decoding comfort noise which is generated at the receiving side). The CN flag is a data pattern easily distinguishable from voice LD-CELP encoding data; by setting its sending time to 1 msec, a sufficiently distinguishable pattern can be generated with 16 bits. The CN data sent following the CN flag has spectrum and level information of the background noise and is transmitted at predetermined time intervals during the silent period.

Figure 2:
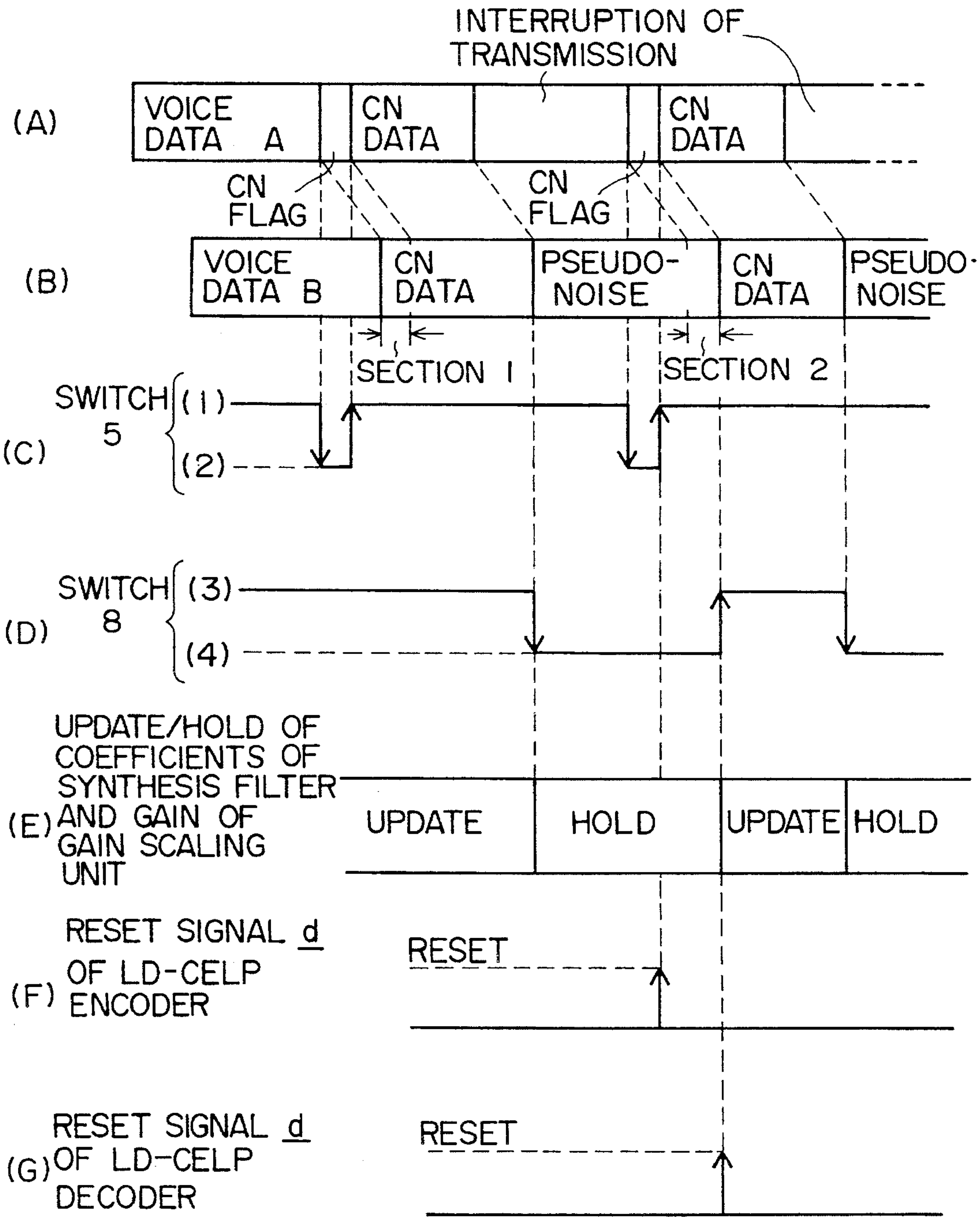
FIG. 2 illustrates timing charts explanatory of the operation of the present invention.

FIG. 2 is a timing chart explanatory of the operation of the present invention.

For instance, the CN flag sending time in FIG. 2 is 1 msec and the succeeding CN data sending time is 10 msec.

Figure 4:
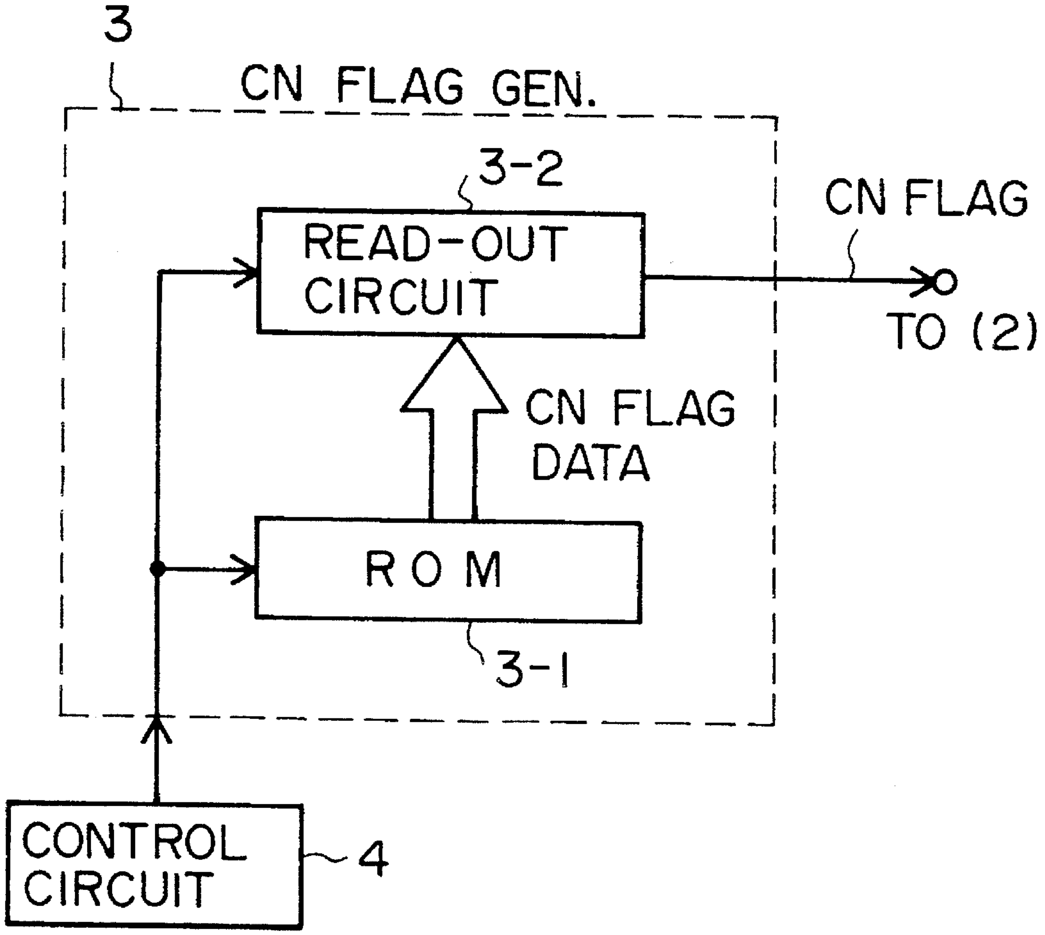
FIG. 4 is a block diagram illustration an example of the construction of a CN flag generator.

FIG. 4 is a block diagram illustrating an example of the CN flag generator 3. The CN flag pattern is prestored in a ROM 3-1, from which it is read out by a read-out circuit 3-2 responding to a control signal from the control circuit 4 and is outputted in serial form to a terminal (2) of a switch 5.

In FIG. 1, reference numeral 4 denotes the control circuit, which, when detecting by the voice detection flag v that the voice-nonactive period has begun, determines the time lengths of CN flag and CN data and their sending time intervals and controls the CN flag generator 3 and the switch 5 accordingly. The control circuit could be implemented using a counter as a principal element. The control circuit applies a reset signal n to the LD-CELP encoder 1 at a predetermined point in time. The output timing of the control signal and the reset signal will be described later on.

Reference numeral 5 denotes a digital signal switch.

Reference numeral 10 denotes a discontinuous transmitter, which is provided to reduce the power dissipation of the transmitting circuit by stopping its transmitting output after completion of the transmission of the CN data following the CN flag once the silent period begins.

In the decoding apparatus shown in FIG. 1, reference numeral 6 denotes a control circuit which detects the pattern of specific data of the CN flag; this control circuit 6 could easily be implemented using a correlation detector. Upon detecting the CN flag, the control circuit 6 controls the operation of an LD-CELP decoder 9 and a switch 8. Furthermore, the control circuit 6 applies a reset signal d to an LD-CELP decoder 9 at a predetermined point in time. The timing for outputting the control signal at the time of detecting the CN flag and the reset signal will be described later on.

Reference numeral 7 denotes a pseudo-noise generator, which outputs pseudo-random data for input into the LD-CELP decoder 9 at a rate of 16 kbit/s. This circuit could easily be implemented by a circuit composed principally of a shift register.

Reference numeral 8 denotes a switch, which is placed under the control of the control circuit 6.

Reference numeral 9 denotes the LD-CELP decoder, whose basic circuit is identical with the circuit defined by the TCC JT-G728 Standards, a method of updating the coefficients of a synthesis filter (spectrum information) and the gain of a gain scaling unit (level information) that are used for decoding is one of the features of the present invention.

In the LD-CELP scheme the synthesis filter coefficients and the gain of the gain scaling unit are derived from voice signals which are decoded by a backward synthesis filter adapter and a backward gain adapter, respectively. In this instance, when the input data to the LD-CELP decoder 9 is data transmitted from the sending side like voice data of CN data and is decoded by the decoder, no problem will be posed. In the present invention, however, during the silent period following the CN data no received signal exists as referred to above and the input to the LD-CELP decoder 9 is switched to the output from the pseudo-noise generator 7; consequently, the spectrum and level of the actual background noise cannot be reproduced. To avoid this, the LD-CELP decoder 9 includes the capability of providing the spectrum and level approximate to those of the actual background noise by holding the synthesis filter coefficient and gain calculated at the time of receiving and decoding the CN data and by decoding the output from the pseudo-noise generator 7 by the use of the held coefficients and gain during the succeeding silent period.

Figure 3:
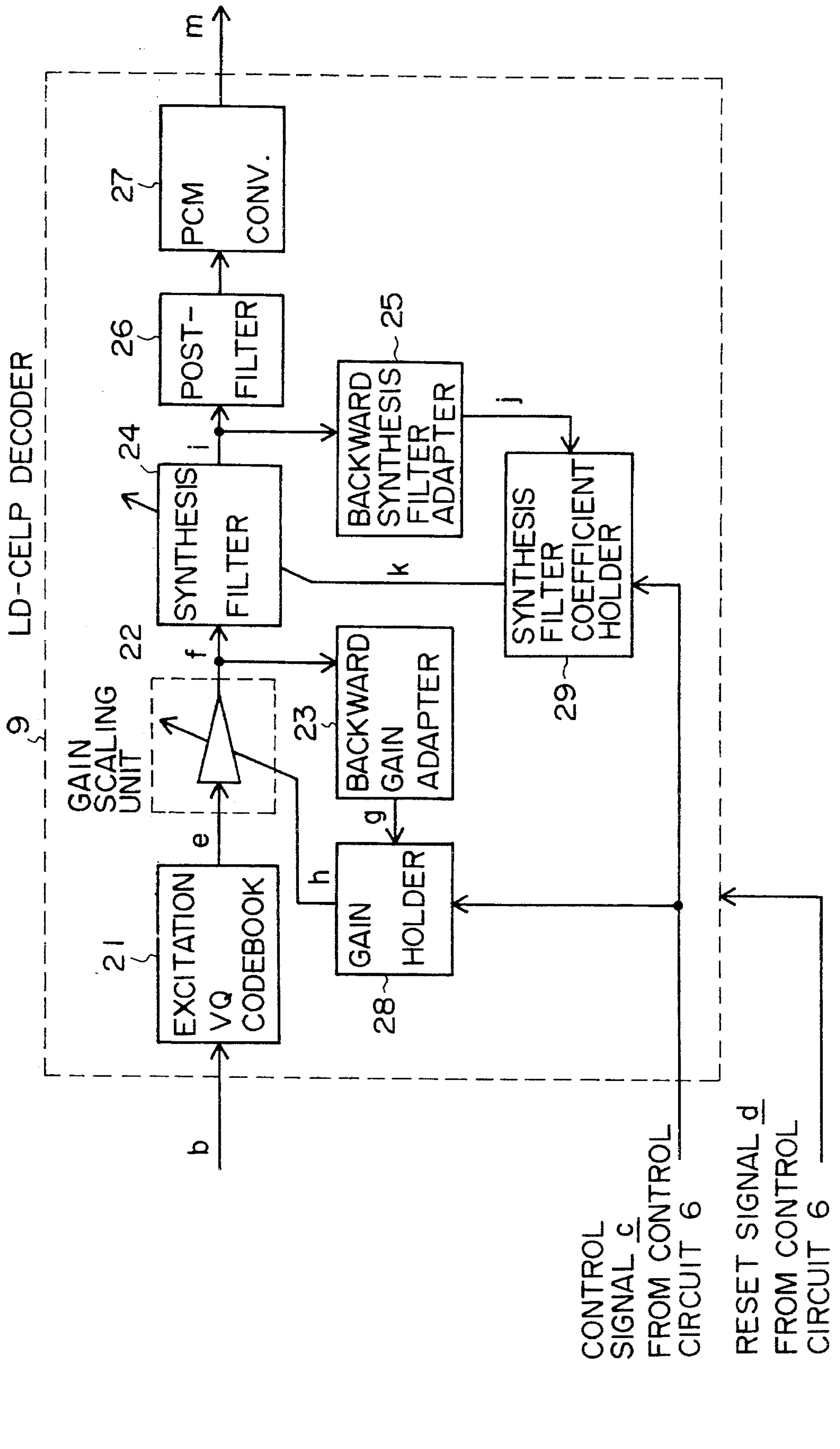
FIG. 3 is a block diagram illustrating an example of a part of the construction of the present invention.

FIG. 3 is a block diagram illustrating an example of the internal circuit of the LD-CELP decoder 9 according to the present invention. Reference numerals 28 and 29 denote a gain holder and a synthesis filter coefficient holder provided according to the present invention. A description will be given of the LD-CELP decoder 9 according to the present invention shown in FIG. 3.

An input signal b (see FIG. 1), which is an index representing the shape and amplitude of the optimal excitation vector e at the current point in time, is used to read out the optimal excitation vector e from an excitation VQ (Vector Quantization) codebook 21. The excitation vector e is gain-scaled by a gain scaling unit 22 using a gain h to obtain a gain-scaled excitation vector f. A backward gain adapter 23 calculates from the previous gain-scaled excitation vector f, through a backward prediction, an updated gain g which is inputted to the gain holder 28. The gain holder 28 responds to a control signal c from the control circuit 6 to hold or pass therethrough (update) the gain g (at the timing described later on). The output h from the gain holder 28 is used as the gain for the next input vector in the gain adapter 22.

Next, the thus gain-scaled excitation vector f is used to drive a synthesis filter 24 to synthesize a reproduced voice vector i. A backward synthesis filter adapter 25 calculates from the previous reproduced voice vector i, through a backward prediction, a synthesis filter coefficient j which is inputted to the synthesis filter coefficient holder 29. The synthesis filter coefficient holder 29 responds to the control signal c from the control circuit 6 to hold or pass (update) the synthesis filter coefficient j (at the timing described later on). The output k from the synthesis filter coefficient holder 29 is used as the synthesis filter coefficient for the next input vector in the synthesis filter 24.

The reproduced voice vector i is processed by a post-filter 26 to provide for enhanced subjective quality, thereafter being converted by a PCM (Pulse Code Modulation) converter 27 to a 64 kbit/s μ-law PCM or 16-bit linear PCM output m.

Next, a description will be given of the control operation at the sending side.

The voice signal is present only when a voice is uttered, whereas the background noise is always present. Upon detecting the absence of the voice signal, the voice activity detector 2 sends a signal to the control circuit 4, which immediately sends a switching signal to the switch 5 to switch the output from the LD-CELP encoder 1 (the terminal (1)) to the output from the CN flag generator 3 (the terminal (2)) so as to indicate it to the receiving side that what is to be sent next is the CN data, not the voice signal. After sending the CN flag for a predetermined period of time, the control circuit changes the switch 5 over again to the output from the LD-CELP encoder (the terminal (1)) to send for a predetermined period of time the CN data, that is, the background noise when no voice signal exists. After this, the discontinuous transmitter 10 stops transmission. The CN flag and CN data are sent at predetermined time intervals.

FIG. 2 is a timing chart explanatory of the above-described operation. A chart (A) shows the output signal which is provided to the transmission line of the encoding apparatus depicted in FIG. 1 and a chart (B) the input signal to the LD-CELP decode 9 of the receiving side. The voice data B is a transmitted version of the voice data A delayed by the transmission to the receiving side. In a section 1 of the chart (B) in FIG. 2, the CN flag is handled as the CN data and is included therein. The CN flag is 1 msec long, and even if input intact into the LD-CELP decoder 9, it will not exert any influence on the reproduced voice output, because it is applied in the background noise period. During the detection of the next CN flag at the receiving side (a section 2 of the chart (B) in FIG. 2), the switch 8 is not switched to the receiving input side, and hence the output from the pseudo-noise generator 7 is applied to the LD-CELP decoder 9.

A chart (c) in FIG. 2 shows the operation of the switch 5 at the transmitting side. At first, when the completion of the voice data A is detected in the encoding apparatus at the transmitting side, the switch 5 is changed over to the CN flag generator side (2), from which the CN flag is outputted in place of the voice data. Upon completion of the CN flag of a certain length, the switch 5 is changed over to the side (1), from which the CN data is sent for a certain period of time, followed by the suspension of transmission. During the silent period these operations are repeated.

It is known in the art that the temporal change of the background noise is relatively gentle; the information about the background noise (CN data) needs only to be intermittently transmitted at suitable time intervals as shown during the interruption of the voice signal, that is, during the interruption of transmission. When the voice signal is detected again thereafter, the voice data A is sent again. When no voice signal is detected, the CN flag and the CN data are repeatedly sent until the detection of the voice signal or the end of transmission.

As described above, according to the present invention, the transmission takes place only when the voice signal is present, and when no voice exists, the CN flag indicating the interruption of transmission and the background noise information (CN data) are sent for a short period of time and thereafter the transmission is stopped. By this, the transmitting power can be decreased. The amount of transmitting power that can be reduced by the present invention is as large as more than 50% of the circuit power consumption at the transmitting side which does not adopts the discontinuous transmission scheme.

Next, a description will be given of the operation at the receiving side.

At the receiving side, it is unknown which data is being transmitted thereto, the voice data, CN flag, or CN data; the control circuit 4 discriminates the received data.

The control circuit 6 always monitors an input data train for detecting the CN flag. In the initial state of the control circuit 6, the input data is supposed to be the voice data and the switch 8 is set to the received data side (3) accordingly.

When the silent period begins, the CN flag is sent from the transmitting side. When detecting the CN flag, the control circuit 6 learns that the data following it is the CN data and that the CN data is followed by the interruption of transmission. When no signal is received after the completion of the CN data, the control circuit 6 controls the switch 8 to change the input of the LD-CELP decoder 9 from the received data side (3) to the pseudo-noise generator 7 side (4), providing the pseudo-noise from the pseudo-noise generator 7 to the LD-CELP decoder 9 during the interruption of transmission. The LD-CELP decoder 9 has the capability of holding the coefficients of the synthesis filter 24 and the gain of the gain scaling unit 22 for the CN data (the actual back-ground noise) to hold the spectrum configuration and level of the background noise. In this case, the LD-CELP decoder 9 decodes the output from the pseudo-noise generator 7 by the use of the coefficient of the synthesis filter and the gain of the gain scaling unit which are fixed and held in the synthesis filter coefficient holder 29 and the gain holder 28, respectively.

A chart (D) in FIG. 2 shows the operation of the switch 8 of the receiving side and a chart (E) the operation of updating/fixing (holding) the coefficient of the synthesis filter and the gain of the gain scaling unit by the LD-CELP decoder 9.

In the LD-CELP encoding and decoding process, to obtain a normal reproduced voice at the receiving side, the decoding needs to be performed under the condition that the values of the coefficients of the synthesis filter and the gain of the gain scaling unit in the LD-CELP encoder 1 of the transmitting side and the values of those in the LD-CELP decoder 9 of the receiving side be always equal during the decoding operation. In the above-described discontinuous transmission processing, however, during the interruption of data transmission from the transmitting side the input data to the LD-CELP decoder 9 at the receiving side is the output from the pseudo-noise generator 7 (different from the background noise data inputted into the LD-CELP encoder 1 at the sending side), and consequently, the coefficient of the synthesis filter and the gain of the gain scaling unit that are obtained by the successive update processing differ from the counterparts in the LD-CELP encoder 1 at the transmitting side.

A solution to this problem is to apply the reset signals n and d from the control circuit 4 and 6 to the LD-CELP encoder 1 and the LD-CELP decoder 9 to reset them to their initial state at the timings shown by charts (F) and (G) in FIG. 2, that is, at the point in time when data transmission is newly started after the transmission interruption period. By this, in the succeeding period, as long as the data transmission continues, the values of the coefficient of the synthesis filter and the gain of the gain scaling unit in the LD-CELP encoder 1 and the values of those in the LD-CELP decoder 9 always remain to be equal, providing a normal reproduced voice.

The description given above makes no mention of how to deal with when the voice is detected again at the transmitting side. Furthermore, the description has been given on the assumption that once the voice signal is interrupted as shown in FIG. 2, an appreciable amount of time (0.5 sec or longer) is taken until the voice signal is detected next. That is, the transmission interruption time is set to 0.5 sec and the CN data period is 10 msec. It is also known in the case of the car telephone that those values are appropriate. However, there is the possibility of the voice signal being detected again tens of milliseconds after no voice signal is detected.

A solution to this problem will hereinbelow be described.

When a voice is detected at the transmitting side immediately after the transmission of the CN flag, the decoding of a normal voice signal is impossible at the receiving side unless the detection of the voice is reported thereto in any form, since the switch 8 remains connected to the pseudo-noise generator 7 side under the control of the control circuit 6.

One method that can be used to avoid this is to set two kinds of CN flag patterns. This is a method that sets different patterns for the CN flag which is sent prior to the start of a voice and for the CN flag which is sent upon completion of the voice.

Another method is one that uses one kind of CN flag and defines that the CN flag to be sent within a prescribed period of time after a first CN flag is a flag indicating the start of a voice.

In the above the components of the circuits in the present invention and methods of implementing them have been described, peripheral circuits of the LD-CELP encoder and decoder can also be easily implemented as a part of a program of a signal processing microprocessor (DSP), since the LD-CELP decoder is usually implemented by the DSP.

By the application of the present invention to the half-rate system of the digital cordless telephone, the comfort noise which is generated at the receiving side during the interruption of transmission from the transmitting side for the voice-nonactive period can be made equal in sound quality and level to the background noise that is sent from the transmitting side. This prevents the reproduction of an unplesant voice at the receiving side.

What I claim is:

1. A voice coding communication system which, with a view to reducing the transmitting power of a voice coding apparatus, interrupts transmission during a voice-nonactive period and uses as the reproduced output in the voice-nonactive period a comfort noise generated at the receiving side, characterized in:

that the transmitting side sends a voice signal after coding it by a 16 kbit/s coding system utilizing a low-delay code excited linear prediction (LD-CELP) scheme and, during the voice-nonactive period, sends a CN (Comfort Noise) flag indicating the voice-nonactive period and a coded background noise for a predetermined period of time only at predetermined time intervals; and;

that the receiving side decodes the received signal by an LD-CELP decoder and outputs the reproduced signal and, when detecting the CN flag from the received signal, holds the coefficients of a synthesis filter and the gain of a gain scaling unit which are internal parameters of the LD-CELP decoder in correspondence to the coded background noise following the CN flag, then switches the input to the LD-CELP decoder to a pseudo-noise generated at the receiving side and decodes the received signal with the held coefficients of the synthesis filter and gain of the gain scaling unit to obtain a reproduced signal as comfort noise.

2. A voice coding apparatus which is provided with a discontinuous transmitter for interrupting transmission during a voice-nonactive period to reduce the transmitting power for transmitting an input voice signal in a coded form, characterized by:

an LD-CELP encoder for encoding the input voice signal into an LD-CELP code;

a voice activity detector for detecting the presence or absence of the voice of the input signal;

A CN flag generator for generating a CN flag indicating the voice-nonactive period;

a switch for switching mutually the output of the LD-CELP encoder and the output of the CN flag generator;

a discontinuous transmitter which transmits the output from the switch to a transmission line, and, after a certain elapsed time from the transmitting of the CN flag, interrupts transmission until the transmission of the next CN flag or until a voice-active period begins; and a control circuit which, upon detecting the start of the voice-nonactive period by a signal from the voice activity detector, controls the switch to send the CN flag and the encoded background noise from the LD-CELP encoder for the predetermined period at the predetermined time intervals during the voice-nonactive period and outputs a reset signal for resetting the LD-CELP encoder at a predetermined point in time.

3. A voice decoding apparatus which is supplied with, as a received signal, a signal interrupted to be transmitted in a voice-nonactive period after a CN flag indicating a voice-nonactive period of an LD-CELP encoded voice signal and an LD-CELP encoded background noise are sent for a predetermined period of time at predetermined time intervals, characterized by:

a pseudo-noise generator for generating the pseudo-noise;

an LD-CELP decoder which decodes the received signal and holds the coefficients of a synthesis filter and the gain of a gain sealing unit at the time of having decoded the LD-CELP encoded background noise, then decodes the generated pseudo-noise inputted next by the use of the held coefficients of the synthesis filter and the held gain of the gain scaling unit;

a switch for selectively inputting the received signal and the pseudo-noise into the LD-CELP decoder; and a control circuit which controls the switch for switching to the pseudo-noise generator side upon completion of the decoding of the LD-CELP encoded background noise after the detection of the CN flag from the received signal and for switching to the received signal side upon detecting the CN flag next, controls the LD-CELP decoder to hold or update the coefficients of the synthesis filter and the gain of the gain scaling unit in accordance with the operation of the switch and outputs a reset signal for resetting the LD-CELP decoder at a predetermined point in time.

* * * * *